United States Patent [19]
Nordquist

[11] Patent Number: 6,160,236
[45] Date of Patent: Dec. 12, 2000

[54] CLAMPING SYSTEM

[75] Inventor: Hakon Nordquist, Taby, Sweden

[73] Assignee: System 3R International AB, Vällingby, Sweden

[21] Appl. No.: 08/982,374

[22] Filed: Dec. 2, 1997

[30] Foreign Application Priority Data

Dec. 2, 1996 [DE] Germany .............................. 196 49 898
Jun. 27, 1997 [EP] European Pat. Off. .............. 97110588

[51] Int. Cl.$^7$ ..................................................... B23H 1/04
[52] U.S. Cl. ...................................... 219/69.15; 279/4.06
[58] Field of Search ............................... 219/69.15, 69.2; 279/4.04, 4.06; 403/354, 364

[56] References Cited

U.S. PATENT DOCUMENTS

| | | | |
|---|---|---|---|
| 4,855,558 | 8/1989 | Ramsbro ............................. | 219/69.15 |
| 5,634,757 | 6/1997 | Schanz .................................. | 403/354 |
| 5,791,803 | 8/1998 | Nordquist ............................ | 219/69.15 |
| 5,906,378 | 8/1998 | Nordquist ............................. | 279/4.06 |
| 5,909,882 | 6/1999 | Schill ................................... | 279/4.04 |
| 6,015,961 | 1/2000 | Lozon et al. ........................ | 219/69.15 |
| 6,036,198 | 3/2000 | Kramer ................................ | 219/69.15 |

FOREIGN PATENT DOCUMENTS

| | | |
|---|---|---|
| 0 255 042 | 2/1988 | European Pat. Off. . |
| 41 16 103 A1 | 11/1992 | Germany . |
| 44 44 241 | 6/1996 | Germany . |

OTHER PUBLICATIONS

ITS 40 Integriertes Elektroden–Spannsystem, Jan. 1, 1986, pp. 1–20.
"The best way towards automatic production.", Erowa, Aug. 1993, pp. 1–35.
"EROWA UPC, das Palettiersystem.", Sep. 1993, pp. 1–8.
"EROWA Systemübnersicht. News 95", Apr. 1996, pp.1–16.
"EROWA Compact", Oct. 1996.
"Gesamtkatalog", Erowa, Jun. 1996, pp. 1–200. (In Color).
"Clamping and Palletizing Systems for Diesinking", Mecatool AG, Dec. 1996, pp. 1–40.
"GPS 20–120 Palletizing system", Mecatool AG, Dec. 1995.
"Reduzieren Sie Maschinenkosten mit Palettiersystemen", Mecatool AG, Dec. 1994, pp. 1–20.
"Istema Senkerosion Die sinkin", Mecatool AG, Dec. 1992, pp. 1–50.
"Minifix, Elektroden mit und ohne Halter", Hirschmann, Apr. 1997.
Drawing, Einspruch Hirschmann, Aug. 29, 1996.
Memorandum, M. Schneidier, Sep. 26, 1996.
Letter of Apr. 14, 1999, to Hirschmann from J. Schmitz and ppa. Dr. G. Zander.
"Euromold Spezial", Mar. 1997.

*Primary Examiner*—Geoffrey S. Evans
*Attorney, Agent, or Firm*—Jacobson, Price, Holman & Stern, PLLC

[57] ABSTRACT

A clamping system includes a workpiece machining head (1) having a coupling member (40), a mating coupling piece (90) and a drawbolt (30), a pressure-medium actuated clamping device (10, 15, 17, 19, 20) for the drawbolt (30) being provided on the workpiece machining head (1), the coupling member (40) having an axial reference axis (Z-axis) (50) and reference parts (42, 44, 46; 41, 43, 45), which are arranged at its end in a plane that is perpendicular to the reference axis and define a Z-reference for a first reference system, and the mating coupling piece (90) having at its end face mating reference parts (91, 93, 98; 95, 97, 99) for the first reference system. In order to make the clamping system universally usable, provision is made for the coupling member (40) to be surrounded by a coupling part (60), whose axis extends parallel to the reference axis (50) and which has reference elements (61, 63, 65, 67; 72, 74, 76, 78) which define a Z'-reference and are assigned to a second reference system.

25 Claims, 4 Drawing Sheets

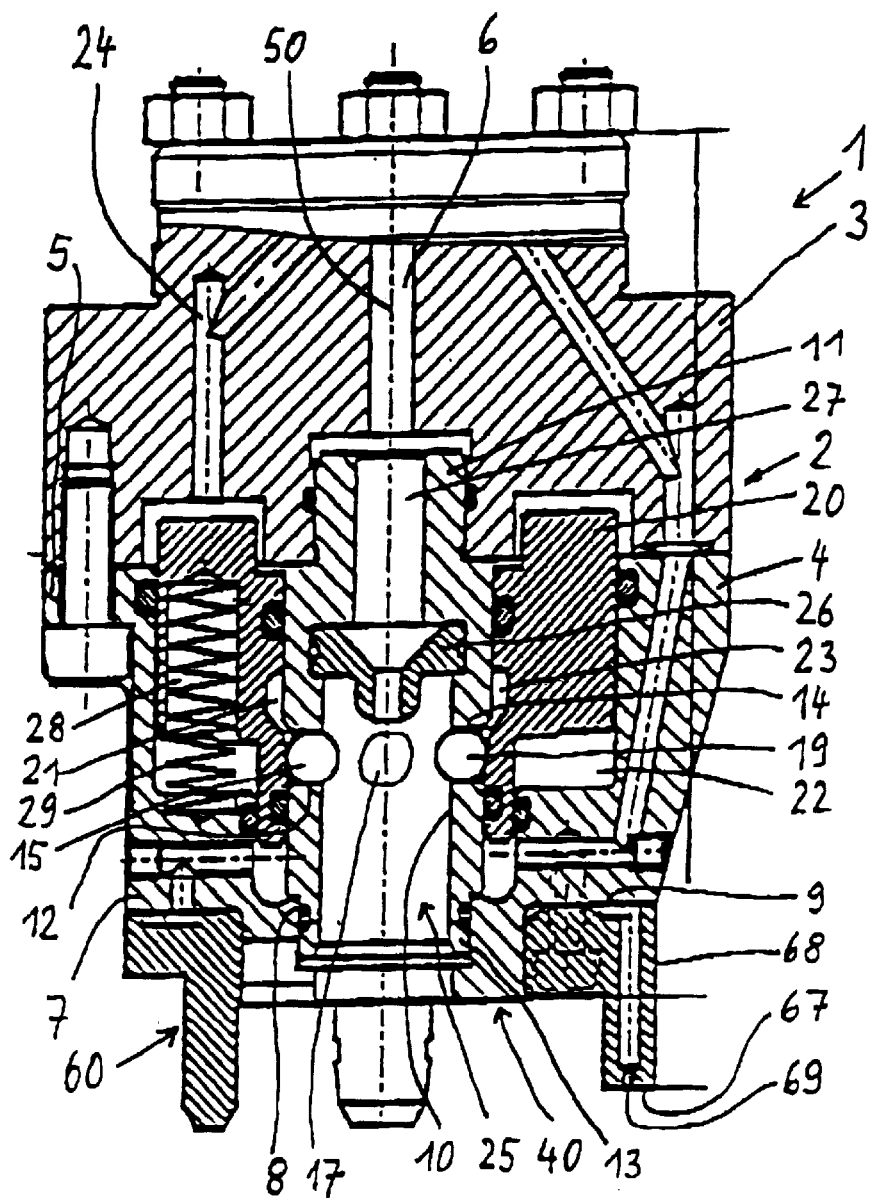
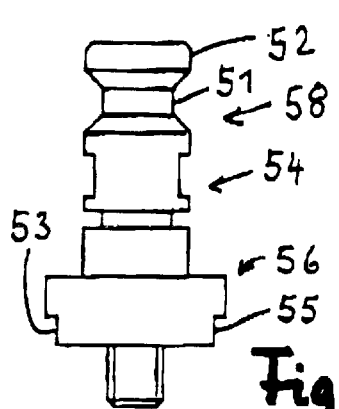
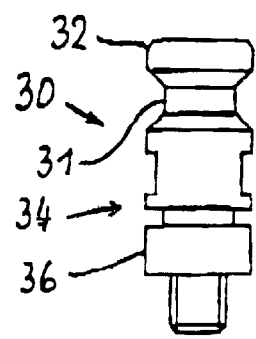
Fig. 2
Fig. 5
Fig. 6

CLAMPING SYSTEM

The invention relates to a clamping system comprising a workpiece machining head having a coupling member, a mating coupling piece and a drawbolt, a pressure-medium actuated clamping device for the drawbolt being provided on the workpiece machining head, the coupling member having an axial reference axis (Z)-axis and reference parts, which are arranged at its end in a plane that is perpendicular to the reference axis and define a Z-reference for a first reference system, and the mating coupling piece having at its end face mating reference parts for the first reference system.

A plurality of different clamping systems are known (EP-A 0255042, DE-A 44 44 241), whose one coupling member can be connected to the head of a workpiece machining machine, preferably an electric erosion machine, and whose other coupling member, which carries either a workpiece to be machined or a tool, can be clamped to the coupling member in a repeatable manner. In spite of very frequent removal and reclamping of the second coupling member, the positional accuracy of the second coupling member in relation to the first coupling member is kept unchanged, with an extremely high accuracy in the range from 1–2 micrometers, within, for example, a cartesian coordinate system.

Depending on the size of the workpiece to be machined, and depending on the complexity of the machining on the workpiece, one clamping system is more suitable in one case and another is more suitable in another case for the intended purpose. Therefore, a first sequence of machining steps on a workpiece can be carried out more expediently on one clamping system, and a sequence of machining steps on another workpiece can be carried out better on the other clamping system. Accordingly, at least two machining devices, which operate with different clamping systems, are needed for such cases.

The invention is therefore based on the object of simplifying the chance from one clamping system to another clamping system without loss of accuracy in the positioning, even given a very high number of clamping and release operations.

To this end, provision is made according to the invention, in the case of the machining head mentioned at the beginning, for the coupling member to be surrounded by a coupling part, whose axis extends parallel to the reference axis and has reference elements which are assigned to a different reference system.

To this end, provision is made according to the invention, in the case of the clamping system mentioned at the beginning, for the coupling member to be surrounded by a coupling part, whose axis (Z'-axis) extends parallel to the reference axis and which has reference elements which define a Z'-reference and are assigned to a second reference system. This makes it possible to clamp a workpiece holder to one and the same machining machine, said workpiece holder having mating reference elements that correspond to a first clamping system and interact with the reference elements, or to clamp on another workpiece holder, which has mating reference parts that correspond to a different clamping system and interact with the reference parts. In the case of numerically controlled machining machines, the parameters which describe the change from one clamping system to the other may be stored appropriately, so that it is possible to operate automatically using the numeric control system of the machining device both with one clamping system and with the other. In this case, the invention is also advantageous in that these parameters, with reference to the Z-axis, only need to describe a possible offset in the Z-direction and a possible offset within the XY-plane, since a tilted position of the coupling part according to the invention in relation to the coupling member is ruled out because of the parallelity of the Z'-axis of the coupling part in relation to the Z-axis of the coupling member.

Currently preferred is an embodiment of the invention in which the Z-axis and the Z'-axis are coordinate, so that an offset within the XY-plane is dispensed with. It is also advantageous that the reference elements are arranged crosswise with a radial spacing from the reference axis (Z'-axis), which facilitates fixing the Z'-axis at the point of intersection of the cross.

It is advantageous if each reference element has a bar that projects axially and has radially parallel, conical side faces, since this design of the reference elements can interact in a particularly simple and highly-accurate manner during clamping with mating reference elements that are preferably arranged crosswise on a further mating coupling piece, each mating reference element having at least one radially parallel, axially elastic lip, which is constructed on a radially parallel slot.

In order to provide a unique Z'-reference, it is recommended to provide on the coupling part a plurality of uprights that are spaced in the peripheral direction and are parallel to the reference axis (Z-axis) and whose free end faces form the Z'-reference. In this case it is recommended that the free end face of the further mating coupling piece is designed, at least in sections, as the Z'-reference, so that the free end face come [sic] to rest against the free end faces of the parallel uprights when tightening the further mating coupling piece against the coupling part.

Furthermore, it is advantageous if a first and a second drawbolt are provided for the first and the second reference system, the first drawbolt having a smaller axial length than the second drawboit and both the drawbolts having a head that cooperates with the clamping device. The second drawbolt, with a second mating coupling piece optionally detachably fastened to it, may be gripped particularly simply and in a defined manner in [sic] by the gripper of a tool magazine, if in a development of the invention the distance between adjacent uprights is at least equal to a predefined spacing for a tool, for example the gripper mentioned, to reach through.

The reference parts defining the Z-reference often have a compressed-air opening, with the result that the compressed air emerging from these openings blows the latter free of impurities when approaching the mating reference. In this case, advantages are provided by an embodiment of the invention according to which the second drawbolt has, on its section opposite the head, a profile that is broadened radially in such a way that when the second drawbolt is inserted into the clamping device the reference parts defining the Z-reference are essentially covered in an airtight manner. It is then possible to dispense with specially controllable shut-off valves for the compressed-air ducts opening into the reference parts.

When changing a tool that is assigned to the second reference system, the associated drawbolt is gripped by the magazine gripper at a predefined axial height. In order to make this height usable for the magazine gripper, in spite of a shorter first drawbolt, even when changing a tool assigned to the first reference system, provision is made, in a development of the invention, for the mating coupling piece to have peripheral sections that are located opposite each other with respect to its axis, are flattened parallel to the axis and are expediently spaced apart axially from the mating reference parts, for the engagement of the tool, for example of the magazine gripper. The programming of the tool changer is simplified thereby.

In addition, preferred configurations of the invention are specified in the subclaims.

The invention is described in detail below using exemplary embodiments illustrated in the attached drawing, in which:

FIG. 2 shows an axial section along the line I—I through the machining head according to FIG. 1;

FIGS. 5 and 6 show schematic illustrations of drawbolts in order to explain the invention further.

Figure 1:
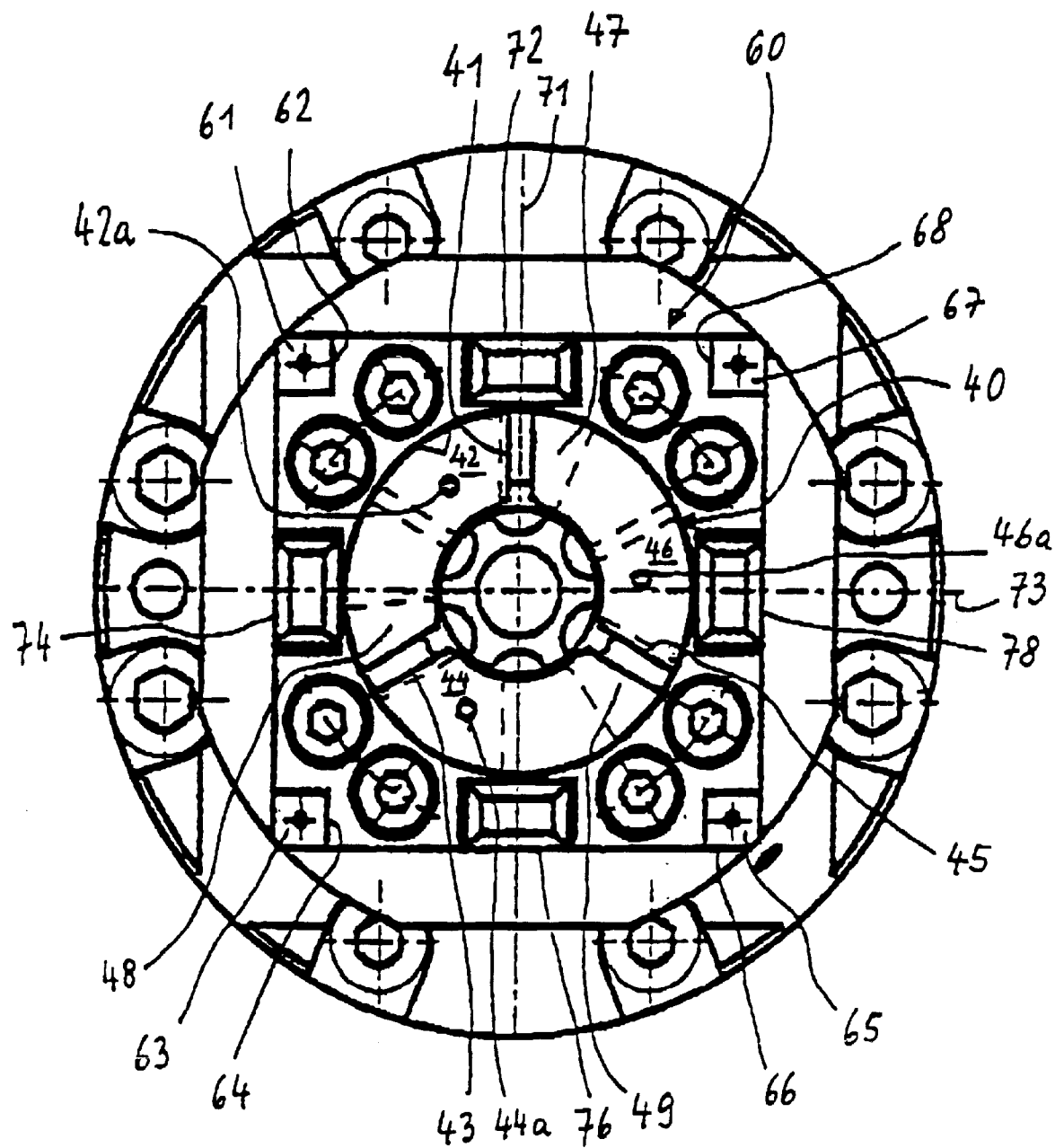
FIG. 1 shows a view from below of a machining head for a cavity spark erosion machine.

The machining head, designated as a whole by 1, has a housing 2, which comprises a plate-like cover 3 and a cup-like main part 4 having a flange 5 projecting radially outward. The cover 3 is provided with a central channel 6, and the bottom 7 of the main part 4 is provided with a central round opening 8, whose clear width is greater than the diameter of the channel 6. The main part 4 is bolted to the cover 3 at its flange 5, which is constructed at the level of the upper main-part rim, such that the channel 6 aligns axially with the opening 8.

Fitted into the radially expanded main-part end of the channel 6 is the upper end 11 of a thick-walled tubular piece 10, with the interposition of a sealing ring, whose lower end 13 is fitted into the opening 8 in a medium-tight manner. A plurality of passage bores 12, 14 that are equally distributed in the peripheral direction are incorporated into a wall of a central section of the tubular piece 10, a latching ball 15, 17, 19 being caught in each of the passage bores such that it can move radially outward.

At the outer face of the central section of the tubular piece 10, an annularly cylindrical piston 20 is axially displaceably arranged in the annular chamber 22 enclosed by the main part 4 and the bottom of the cover 3. In the inner wall of the piston 20, a number of depressions 21, 23 that are matched to the shape of the latching balls, the number being equal to the number of latching balls 15, 17, 19, are constructed such that when the piston 20 is located at the lower turning point of its displacement travel, each latching ball can penetrate into the depression that is adjacent to it to such an extent that none of the latching balls projects radially inward beyond the inner wall face of the tubular niece 10. If the piston 20 is located at the upper turning point of its displacement travel, the inner wall of the piston has pressed each of the latching balls out of its depression and into the associated passage bore 12, 14 to such an extent that each latching ball projects partially radially inward beyond the inner wall face of the tubular piece 10, according to FIGS. 1 and 2.

According to EP-A-0 255 042, the axial displacement of the piston 20 on the tubular piece 10 in the direction of the bottom 7 of the main part is performed under the action of compressed air, which can be fed to the upper part of the annular chamber 22, left free by the piston 20, via a compressed-air duct 24 driven through the cover 3, from a compressed-air source which is not illustrated. Also not illustrated are controllable venting means for the compressed-air duct 24. One (or more) compression springs 29, which are supported on one side on the bottom 7 of the main part and on the other side in a pocket 28 (by a plurality of identical pockets) in the piston 20, presses the piston 20 axially in the direction of the upper turning point of its displacement travel, as FIG. 1 shows.

The tubular piece 10 has a bolt receptacle 25, proceeding from its open lower end 13, of a predefined clear width and circular cross section, which extends inward beyond the ring of latching balls 15, 17, 19, has an inserted sealing cuff 26 at its inner end and, on the other side of the sealing cuff 26, merges with a radially inwardly stepped shoulder into a flushing channel 27 of reduced diameter that communicates with the channel 6.

Figure 3:
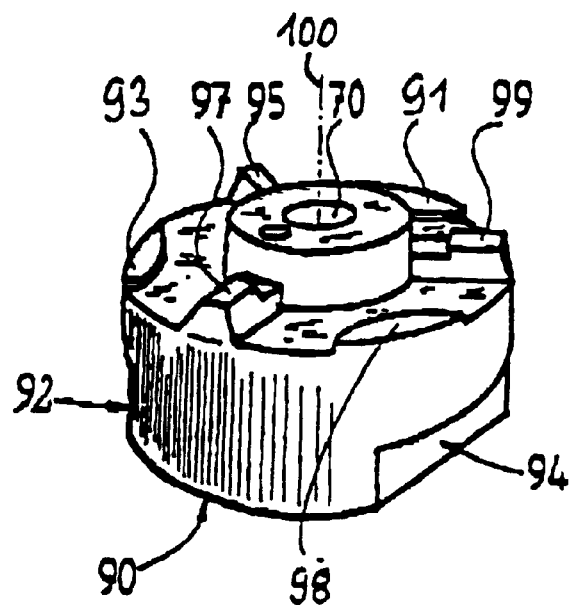
FIG. 3 shows a perspective view of a first mating coupling piece.

An essentially cylindrical first drawbolt 30 (FIG. 6) having an axially stepped outer contour has, at its cylindrical head 32 and its central section 34, an outer diameter which corresponds to the clear width of the bolt receptacle 25, so that the drawbolt 30 can be inserted into the bolt receptacle 25. To this end, the drawbolt 30 has, between head 32 and central section 34, a turned-down section 31, into which the latching balls 15, 17, 19 can penetrate and, as a result, securely hold the drawbolt 30 in the bolt receptacle 25 against downward withdrawal of the drawbolt, when the piston 20 is located in its upper turning point of its displacement travel. The drawbolt 30 can be fasten e d permanently or temporarily (in a manner not shown) to a first mating coupling piece 90 (FIG. 3), using its lower section 36.

The mating coupling piece 90 has an essentially cylindrical jacket. Three bars 95, 97, 99, which are expediently spaced apart equally in the peripheral direction, project axially from its upper side, each of said bars extending radially outward, starting from a central, elevated ring 96 that encloses a central passage bore 70, and having two opposite, radially parallel wedge faces. The outer contours of all the bars 95, 97, 99 are identical. The bars 95, 97, 99, together with their wedge faces, belong in the sense of the claims to mating reference parts of a first reference system, which will be discussed further.

Constructed in each case between two bars, in the peripheral direction and close to the periphery of the mating coupling piece 90, are exactly planar part faces 91, 93, 98, which are located on a common plane extending transversely in relation to the axis 100 of the mating coupling piece 90. This plane lies axially below the axial height of the wedge faces of the bars 95, 97 and 99, and can form a Z-reference plane in the first reference system. In the practical use of the invention, a workpiece or tool, for example an electrode, is also fastened to the underside of the mating coupling piece 90. Finally, two flaps 92, 94 are constructed on the underside of the first mating coupling piece 90, located opposite each other with reference to the axis 100 and parallel to the axis 100 and at the same radial spacing from the axis 100, which parallel flaps will be discussed further.

Constructed at the free end of the bottom 7 of the main part is a coupling member 40, which is known from the specification DE-A-44 44 241. As reference parts, the coupling member has three reference parts 42, 44, 46, spaced apart equally in the peripheral direction, in the form of area sections, which extend in an XY plane lying transversely in relation to the axis 50 of the machining head 1. In the first reference system, the axis 50 forms the Z-axis. Constructed between each two first reference parts 42, 44, 46, on the coupling member 40, are radial stop edges 41, 43, 45, as boundaries taken in the peripheral direction of a slot in each case, each slot being bounded with respect to the associated stop edge by an elastic pressure element in the form of a radially elastic lip 47, 48, 49 that acts in the peripheral direction. The position of the stop edges 41, 43, 45 in the peripheral direction is matched to the position of the bars 95, 97, 99, so that when the mating coupling piece 90 is tightened by means of the drawbolt 30, the bars 95, 97, 99 can penetrate into the slots on the coupling member 40, until the part faces 91, 93, 98 come to rest against the reference parts 42, 44, 46. The axis 100 then coincides with the Z-axis 50, and the mating coupling piece 90 is positioned in angular terms in an XY-plane that is perpendicular to the Z-axis 50.

In addition, a coupling part which is designated as a whole by 60 and which surrounds the coupling member 40 circumferentially is fastened to the machining head 1, to be specific to the free end face of the bottom 7 of the main part. To this end, an axially set-back annular shoulder 9, to which the coupling part 60 is bolted, is constructed radially outside the first reference parts 42, 44, 46 on the bottom 7 of the main part. Projecting from the four corner regions of the coupling part 60, which has a square outline, is in each case an upright 62, 64, 66, 68. Each upright has a flat-ground free end face 61, 63, 65, 67 such that all four end faces 61, 63, 65, 67 lie in an (XY) plane that is perpendicular to the Z-axis 50 and thus form a Z reference.

In addition, in each case a pin 72, 74, 76, 78 projects from the coupling part 60 between each two uprights 62, 64, 66, 68, said pins being arranged and constructed as follows: the radial width of the coupling part 60 is at least sufficiently greater than that of the coupling member 40 that one of the pins 72, 74, 76, 78 can be constructed at the center of each side edge of the coupling part 60.

The pins 72, 74, 76, 78 are therefore arranged crosswise and centrally between the uprights. The width, taken parallel to the associated side edge of the coupling part 60, of each pin is selected, inter alia, such that an arm of a gripper (not illustrated) of an automatic tool-changing magazine (likewise not illustrated) can be moved in each case between an upright and the adjacent pin, in order to be able to grip the mating coupling piece 90 at the flaps 92, 94, if the mating coupling piece 90 is located on the machining head 1 by means of drawbolts 30. In addition, each pin 72, 74, 76, 78 is provided at its free end with opposite, radially parallel and downwardly and inwardly sloping wedge faces. These wedge faces cross the (XY-) plane defined by the end faces 61, 63, 65, 67. in addition, the two center lines 71, 73 drawn in each case through the two opposite pins 72, 76 and 74, 78, respectively, define at their point of intersection the position of a Z'-axis, not drawn in in the figures, which extends parallel to the Z-axis 50. In the exemplary embodiment of the invention illustrated, however, the pins 72, 74, 76, 78 are aligned in such a way that the center lines 71, 73 lie on radii, and therefore the Z'-axis is collinear with the Z-axis 50.

Figure 4:
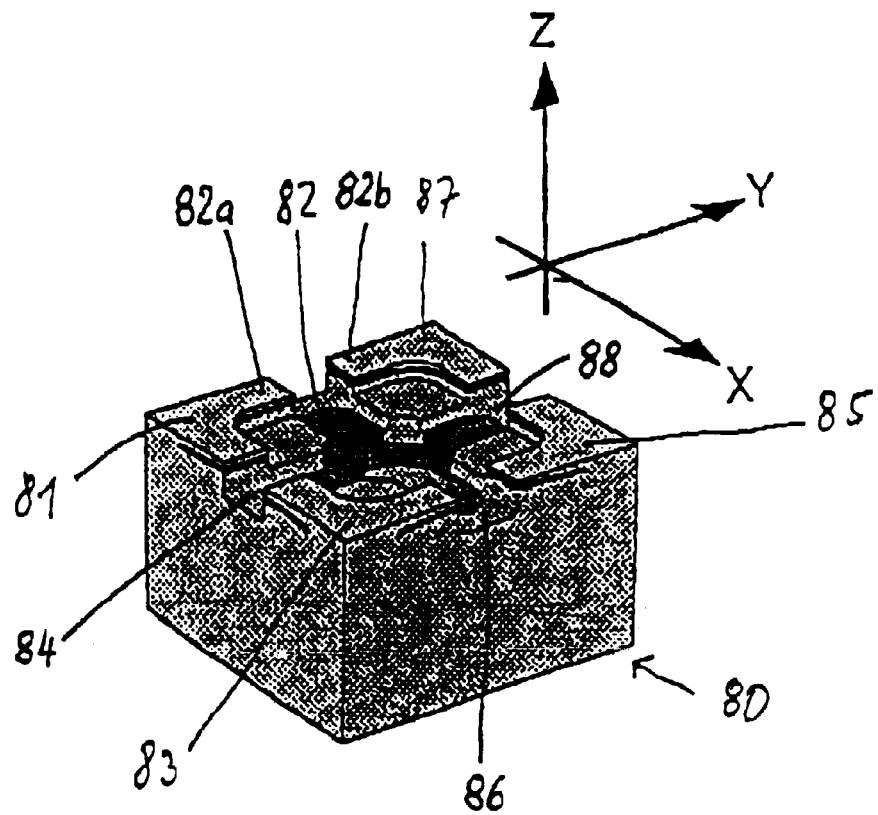
FIG. 4 shows a perspective top view of a second mating coupling piece.

The end faces 61, 63, 65, 67 and the wedge faces of the pins 72, 74, 76, 78 are reference elements of a second reference system, to which a second mating coupling piece 80 that is equipped with mating reference elements (FIG. 4) and a second drawbolt 58 (FIG. 5) belong. The second drawbolt 58 has a head 52, a central section 54 and a turned-down section 51, which in their dimensions are identical to those of the head 32, of the central section 34 and of the turned-down section 31 of the drawbolt 30. Both drawbolts 30 and 58 can therefore be inserted into the bolt receptacle 25.

As is easily revealed by a comparison of FIGS. 5 and 6, however, the second drawbolt 58 has a greater axial length than the first drawbolt 30. This has its cause in the fact that the lower section 56 of the second drawbolt 58 is lengthened axially by an attachment 53 when compared with the lower section 36 of the first drawbolt 30. The attachment 53 is broadened radially so sharply that, after the second drawbolt 58 has been inserted into the bolt receptacle 25, its surface completely covers the coupling member 40, or at least covers it to such an extent that air outlet openings 42a, 44a, 46a in the area sections 42, 44, 46 are essentially closed in an airtight manner. At the lower end, the lower section 56 has, parallel to the longitudinal axis of the drawbolt 58, flaps 53, 55 that extend opposite each other in relation to the longitudinal axis and, both in their axial extent and in their mutual radial spacing, equate to the flaps 92, 94 on the first mating coupling piece 90. If the second drawbolt 58 is inserted into the bolt receptacle 25, the gripper mentioned of a tool-changing magazine can therefore grip the drawbolt 58 at the flaps 53, 55. In addition, the second drawbolt 58 can be coupled in a manner known per se to the second mating coupling piece 80, for example using a bayonet closure.

The second mating coupling piece 80 is essentially the electrode holder known from EP-A-0 255 042, so that for its more exact description, reference may be made to this specification.

It is therefore sufficient to point out here that, in the corner regions cf the upper side of the mating coupling piece 80, which has a square cross section, four plane-ground part faces 81, 83, 85, 87 are constructed, which are located in an (XY-) plane that is perpendicular to the central axis of the mating coupling piece 90 and, when tightened against the coupling piece 60 by means of the drawbolt 58, interact with the end faces 61, 63, 65, 67 to form a Z-reference in the second reference system. In addition, four grooves 82, 84, 86, 88 with radially parallel flanks are made in the upper side in a crosswise arrangement such that in each case one groove 82, 84, 86, 88 is arranged centrally between each two part faces 62, 64, 66, 68. Constructed in each case on the opposite flanks of each groove is a pair of axially elastic lips, whose lips on the groove 82 are designated by 82a and 82b. The arrangement as a whole is made in such a way that when the second mating coupling piece 80 is tightened against the coupling part 40, the wedge faces of the pins 72, 74, 76, 78 penetrate between the lips of a pair until the part faces 81, 83, 85, 87 come to rest on the end faces 61, 63, 65, 67. The second mating coupling piece 80 is then exactly aligned with the machining head 1, both in the Z-direction 50 and in the XY-plane.

It can be seen that the coupling member 40, together with the associated reference parts 42, 44, 46 and 41, 43, 45, as well as the first mating coupling piece 90, together with mating reference parts 91, 93, 98 and 95, 97, 99 belong to a first reference system, and the coupling part 60, together with reference elements 61, 63, 65, 67, as well as the wedge faces of the pins 62, 64, 66, 68, together with the second mating coupling piece 80, belong to a second reference system, which surrounds the first reference system.

The two reference systems have been described above as aligned with the Cartesian XYZ orthogonal system. However, the invention can also be applied in the same way to two different reference systems, one or both of which is built up on another reference system, for example on polar coordinates. Both reference systems have the Z-axis 50 in common and, with respect to this axis, the numerical control of the machining head 1, when changing from the inner to the outer reference system, needs only to add a constant d to the position data in the Z-direction, this constant corresponding to the axial spacing of one of the end faces 61, 63, 65, 67 from one of the first reference parts 42, 44, 46. The position data in the X-direction and in the Y-direction remain unaltered during the change. For the positioning of the gripper of a tool-changing magazine in the X-, Y- and Z-direction, there is no influence from the change, since in the case of the first mating coupling piece 90 tightened against the machining head 1, the position of the flaps 92, 94 in the Z-direction is identical to the position of the flaps 53, 55 on the second drawbolt 58, when the latter is inserted into the bolt receptacle 25.

It can be seen from FIG. [sic] 1 that the first reference parts 42, 44, 46 have the openings 42a, 44a, 46a mentioned, each of which is connected via a compressed-air duct to a compressed-air source. Correspondingly, a compressed-air duct opens into each of the end faces 61, 63, 65, 67 at openings of which one is indicated by 69 at the upright 68. Each of these compressed-air ducts is connected to a compressed-air source. Not illustrated are pressure sensors in the machining head or in the machining machine, which register a change in the air pressure in the said compressed-air ducts and report it to the machine control system. If, for example, the first mating coupling piece 90 is placed against the coupling member 40, the openings 42a, 44a, 46a are closed by the faces 91, 93, 98, with the result that the air pressure in the compressed-air ducts rises. An appropriate signal from the associated pressure monitor is interpreted by the control system to the effect that the first mating coupling piece 90 is tightened against the coupling member 240 [sic].

Accordingly, the control system can establish the tightening of the second mating coupling piece 80 against the end faces 61, 63, 65, 67 by means of a further pressure sensor, and can take this as a trigger for changinq over to the second reference system.

Figure 7:
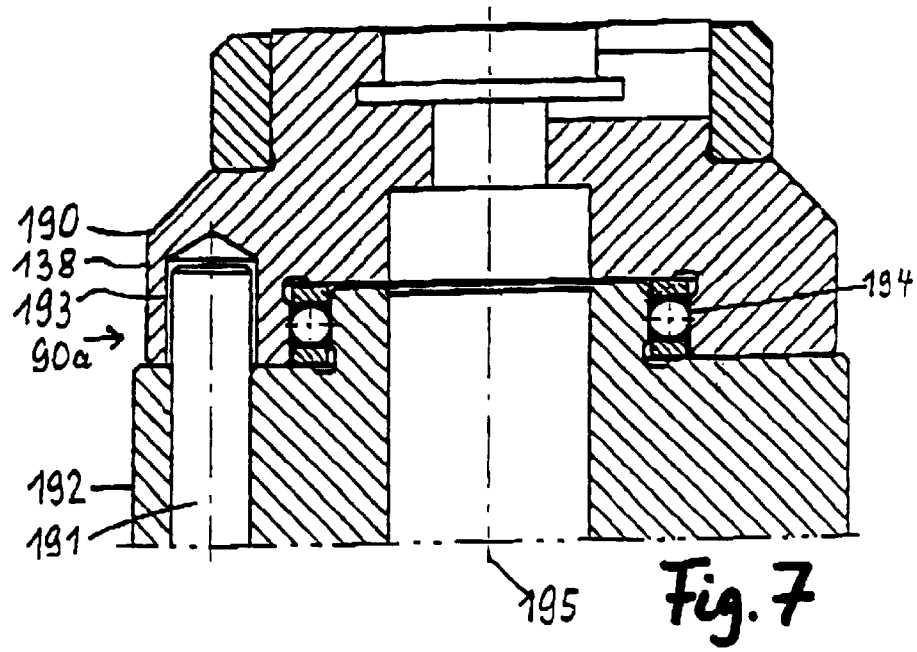
FIGS. 7 and 8 show a further embodiment of the first mating coupling piece.
Figure 8:
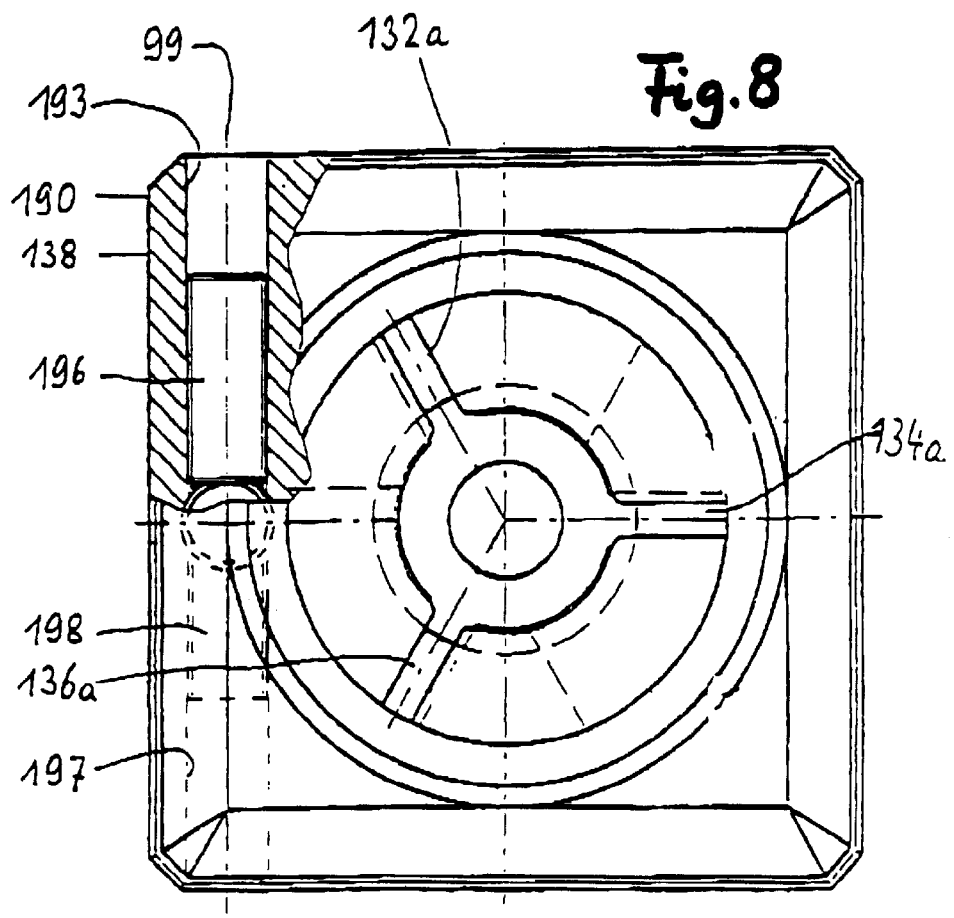

For the purpose of adaptation to the invention, the first mating coupling piece 90 can be designed in a particular way, as shown in FIGS. 7 and 8. Using this embodiment, it is possible to readjust one of the bars 95, 97, 99 finely in a predefined X-direction or a predefined Y-direction. To this end, the first mating coupling piece 90a has an attachment 190 which is rotatable about the common axis 195 in relation to a lower part 192 provided for the connection to a workpiece to be machined, by courtesy of a ball-bearing ring 194 inserted between the two parts. Fitted into the body of the lower part 192 is an adjusting pin 191 that extends parallel to the axis 195, which is elevated above the lower part 192 and penetrates into a capacious blind bore 193 in the attachment 190. Made in the attachment 190 are two aligning threaded holes 193, 197, whose common center line 199 extends transversely to the center line of the adjusting pin 191 and essentially parallel to one side edge 138 of the attachment 190.

A first adjusting screw 196 is screwed into the threaded hole 193, and a second adjusting screw 198 is screwed into the threaded hole 197, both to such an extent that the adjusting screws 196, 198 contact the adjusting pin 191 on opposite sides. For example, by slightly unscrewing the adjusting screw 196 within the hole 193, and correspondingly screwing in the adjusting screw 198 in the hole 197, the attachment 190 is rotated in relation to the lower part 192 in the clockwise direction in the top view reproduced in FIG. 8, and hence one of the bars 132a, 134a, 136a is readjusted within the XY-plane in a specific, predefined X-direction or Y-direction.

What is claimed is:

1. In a clamping system comprising a workpiece machining head having a coupling member, a mating coupling piece and a drawbolt, a pressure-medium actuated clamping device for the drawbolt being provided on the workpiece machining head, said coupling member having an axial reference axis (Z-axis) and reference parts which are arranged at its end in a plane that is perpendicular to said reference axis and define a Z-reference for a first reference system, said mating coupling piece having at its end face mating reference parts for the first reference system, wherein the improvement comprises said coupling member being surrounded by a coupling part having an axis (Z'-axis) that extends parallel to said reference axis and which has reference elements which define a Z'-reference that are part of a second reference system.

2. The system according to claim 1, wherein said Z-axis and Z'-axis arc collinear.

3. The system according to claim 1, wherein said Z-reference and Z'-reference have a fixed axial spacing (d).

4. The system according to claim 1, wherein said reference elements include pins that arc arranged crosswise and radially spaced from the Z'-axis.

5. The system according to claim 4, wherein said pins project axially and have radially parallel, conical side faces.

6. The system according to claim 1, wherein said reference elements of said coupling part include a plurality of uprights that are spaced peripherally and are parallel to said Z'-axis and have free end faces that form the Z'-reference.

7. The system according to claim 6, wherein the distance between adjacent reference elements is at least equal to a predefined spacing for a gripper tool to reach though.

8. The system according to claim 1, further comprising a second drawbolt for clamping a second mating coupling piece to said coupling part, said second mating coupling piece having mating reference parts for said second reference system, the first drawbolt having a smaller axial length that the second drawbolt and both drawbolts having an identical head that cooperates with said clamping device.

9. The system according to claim 8, wherein said second drawbolt has, on a section opposite its head, a profile that is broadened radially such that when the second drawbolt is inserted into the clamping device the reference parts defining the Z-reference are covered substantially airtight.

10. The system according to claim 1, wherein said mating coupling piece has peripheral sections that are located opposite each other with respect to the mating coupling piece axis and are flattened parallel to the axis, for the engagement of a gripping tool.

11. The system according to claim 10, wherein said peripheral sections are spaced axially from said mating reference parts.

12. The system according to claim 11, further comprising, a second drawbolt for clamping a second mating coupling piece to said coupling part, said second drawbolt including a pair of flaps arranged opposite to each other, and wherein the position of said peripheral sections of tile mating coupling piece is identical in Z-direction with respect to a free end surface of the first drawbolt when coupled with the mating coupling piece to the position of said flaps on the second drawbolt with respect to a free and surface of the second drawbolt for allowing a gripping tool to engage each of the first and second mating coupling pieces without any change of the position of the gripping tool.

13. The system according to claim 1, wherein said mating coupling, piece includes a plurality of planar faces that project axially forming the Z-reference with said reference parts.

14. The system according to claim 1, further comprising a second mating coupling piece having at its free end face, mating reference elements for interacting with the reference elements of the second reference system.

15. The system according to claim 14, wherein said mating reference elements of said second mating coupling piece are arranged crosswise and each said mating reference element has at least one radially parallel, axially elastic lip.

16. The system according to claim 14, wherein said free end face of said second mating coupling piece includes sections to define the Z'-reference.

17. The system according to claim 1, further comprising an attachment which carries the mating reference parts, which is axially rotatable relative to a lower part carrying the workpiece, and an adjusting device being provided that acts between said attachment and lower part.

18. The system according to claim 17, further comprising on the lower part an adjusting pin in axial alignment, which extends into said attachment, and setting screws that can be brought to bear on the adjusting pin being provided in the attachment.

19. The system according to claim 1, wherein said reference parts have a plurality of radial contact edges and said mating reference parts of said mating coupling piece include radial bars, each contact edge being associated with an elastic pressure element, said contact edges and pressure elements being spaced apart in the peripheral direction, such that when the mating coupling piece is tightened against the coupling member, in each case a radial bar can penetrate between the contact edge and elastic pressure element.

20. A clamping system for separately clamping differently-configured first and second coupling pieces to a machining head of an electrical discharge machine, each of said first and second coupling pieces configured to carry a tool, such as an electrode, and each of said first and second coupling pieces including a drawbolt associated therewith, and wherein said first coupling piece includes first coupling piece reference elements and said second coupling piece includes second coupling piece reference elements different from said first coupling piece reference elements, said machining, head including an axially-oriented drawbolt cavity to receive each said drawbolt and a pressure-medium actuated clamping structure to releasably clamp each said drawbolt within said drawbolt cavity, said machining head including a first coupling member having first coupling member reference parts arranged about its axial reference axis (Z-axis) and defining a Z-reference lying in a plane perpendicular to said reference axis (Z-axis), said machining head further including a second coupling member having second coupling member reference parts arranged about its axial reference axis (Z'-axis), parallel to said reference axis (Z-axis), and defining a Z'-reference lying in a plane perpendicular to said reference axis (Z'-axis), wherein said second coupling member reference parts surround said first coupling member reference parts, and wherein said first coupling piece reference elements are engageable with said first coupling member reference parts to define a first reference system when said drawbolt of said first coupling piece is clamped within said drawbolt cavity and wherein said second coupling piece reference elements are engageable with said second coupling member reference parts to define a second reference system when said drawbolt of said second coupling piece is clamped within said drawbolt cavity.

21. The clamping system of claim 20 wherein said Z-axis and Z'-axis are collinear.

22. The clamping system of claim 21 wherein said Z-reference and Z'-reference lie in axially spaced-apart planes.

23. The clamping system of claim 22, wherein said first coupling piece includes gripping tool flaps and said drawbolt associated with said second coupling piece includes a drawbolt attachment having gripping, tool flaps, wherein the axial distance between the gripping tool flaps of said first coupling piece and a free end surface of the first coupling piece drawbolt is identical to the axial distance between the gripping tool flaps of said drawbolt attachment and a free end surface of the second coupling piece drawbolt.

24. A clamping system for clamping two differently-configured coupling pieces to a machine head of an electrical discharge machine, said machine head having first reference elements on an end face thereof and defining a first reference system with corresponding reference elements of a first coupling piece, and having second reference elements on said end face and defining a second reference system with corresponding reference elements of a second coupling piece, the first reference system including a Z-axis reference surface on said machine head face, the second reference system including a Z'-axis reference surface on said machine head face which is axially spaced from said Z-axis reference surface, wherein the Z- and Z'-axes are collinear, said machine head further including a single pressure-medium actuated clamping mechanism for clamping each of the first and second coupling pieces to said machine head.

25. The clamping system of claim 24 wherein said machine head includes an axially-oriented drawbolt cavity for receiving drawbolts associated with each of said differently-configured coupling pieces, said pressure-medium actuated clamping mechanism defining a part of the drawbolt cavity.

* * * * *